(12) United States Patent
Bannai

(10) Patent No.: US 6,873,346 B2
(45) Date of Patent: Mar. 29, 2005

(54) IMAGE FORMING APPARATUS

(75) Inventor: Kazunori Bannai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 122 days.

(21) Appl. No.: 10/437,558

(22) Filed: May 13, 2003

(65) Prior Publication Data
US 2004/0036761 A1 Feb. 26, 2004

(30) Foreign Application Priority Data

May 14, 2002 (JP) .................................... 2002-138932

(51) Int. Cl.⁷ .......................................... G03G 15/01
(52) U.S. Cl. ................... 347/116; 347/234; 347/248; 399/301
(58) Field of Search .................... 347/116–119, 132, 347/234, 248; 399/298, 301

(56) References Cited

U.S. PATENT DOCUMENTS

| | | | |
|---|---|---|---|
| 5,219,154 A | 6/1993 | Fukube et al. |
| 5,224,693 A | 7/1993 | Taguchi et al. |
| 5,227,842 A | 7/1993 | Hayashi et al. |
| 5,255,904 A | 10/1993 | Taguchi et al. |
| 5,270,783 A | 12/1993 | Bisaiji et al. |
| 5,297,376 A | 3/1994 | Taguchi et al. |
| 5,315,322 A | 5/1994 | Bannai et al. |
| 5,316,282 A | 5/1994 | Fukube et al. |
| 5,325,213 A | 6/1994 | Takahashi et al. |
| 5,390,033 A | 2/1995 | Bannai et al. |
| 5,471,277 A | 11/1995 | Fujioka et al. |
| 5,583,607 A | 12/1996 | Fujioka et al. |
| 5,583,662 A | 12/1996 | Takahashi et al. |
| 5,610,720 A | 3/1997 | Fujioka et al. |
| 5,682,227 A | 10/1997 | Taguchi et al. |
| 5,689,348 A | 11/1997 | Takahashi et al. |
| 5,847,845 A | 12/1998 | Takahashi et al. |
| 6,075,624 A | 6/2000 | Bannai et al. |
| 6,184,910 B1 * | 2/2001 | Sasaki et al. ................ 347/116 |

FOREIGN PATENT DOCUMENTS

| | | |
|---|---|---|
| JP | 08152833 | 6/1996 |
| JP | 10014291 | 1/1998 |

* cited by examiner

*Primary Examiner*—Huan Tran
(74) *Attorney, Agent, or Firm*—Cooper & Dunham LLP

(57) ABSTRACT

There is provided an image forming apparatus able to form color images of higher quality without color deviation in an inexpensive way. A displacement driving unit is provided to move an optical element unit to displace a beam spot on a photoconductor in the sub scanning direction. A first detection unit is provided to detect the turning cycle of a transfer member, and a second detection unit is provided to detect writing timing of a laser beam from the optical element unit on the photoconductor. When writing a number of toner images on the photoconductor in sequence, the optical element unit is moved and the beam spot is displaced on the photoconductor in the sub scanning direction to correct the writing position on the photoconductor and eliminate deviation of image transfer positions on the transfer member. The magnitude of the displacement of the beam spot on the photoconductor is determined by the time difference between a first signal from the first detection unit and a second signal from the second detection unit.

9 Claims, 9 Drawing Sheets

MAIN SCANNING DIRECTION

IMAGE FORMING APPARATUS

BACKGROUND OF THE INVENTION

1. Field of the Invention

The present invention relates to an image forming apparatus, specifically, an image forming apparatus able to easily and inexpensively suppress color deviation in color images.

2. Description of the Related Art

There are several kinds of color image forming apparatuses in the related art; one of them is the electrophotographic color image forming apparatus, which uses a semiconductor laser in its scanning optical system. In such a color image forming apparatus, a laser beam is modulated according to a color image signal generated when the original image is scanned, and is emitted to a photoconductor drum or a photoconductor belt to form latent images there; then the latent images are developed by toners having appropriate colors and are transferred to paper.

There are two types of electrophotographic color image forming apparatuses: one of them forms an image of a single color with an independent image forming unit; the other type forms color images with a single image forming unit. Generally, the former is called a four tandem engine type, because it has four image forming units corresponding to black, yellow, magenta, and cyan colors, respectively; the latter one is called a single engine type, because it uses only one image forming unit to form images combining four colors of black, yellow, magenta, and cyan.

In the single engine color image forming apparatus, a laser beam is emitted from a laser writing unit to a photoconductor belt to write latent images of black, yellow, magenta, and cyan colors in sequence on the surface of the photoconductor belt. Once a latent image having one of the above four colors is written to the photoconductor belt, this latent image is developed into a toner image immediately by a roller developer. The roller developer has four sleeves corresponding to black, yellow, magenta, and cyan colors, respectively, and a color toner corresponding to the color latent image is supplied to the photoconductor belt by a sleeve for this color.

The developed toner image is transferred from the photoconductor belt to an intermediate transfer belt, which is in constant contact with the surface of the photoconductor belt. This is the so-called "first transfer". Usually, detectors are placed in the color image forming apparatus to detect marks acting as references on the intermediate transfer belt and output reference signals. Using the reference signals from the detectors, timing of forming latent images of different colors is unified, and latent images of different colors are formed on the photoconductor belt with the laser beam being emitted with appropriate time delays. As a result, images of different colors are formed at the same respective positions on the photo conduct belt.

A color toner image is transferred to the surface of the intermediate transfer belt by the first transfer process, and after the transfer of an image, the residual toner on the photoconductor belt is removed using a cleaner. The first transfer is repeated each time the intermediate transfer belt turns one cycle, consequently, toner images of the black, yellow, magenta, and cyan colors are transferred in sequence to the surface of the intermediate transfer belt. The toner images of the four colors are superimposed on the intermediate transfer belt, and so a color image is formed on the intermediate transfer belt.

The color image on the intermediate transfer belt is transferred to paper fed by a paper feed tray (the so-called second transfer). The image is fused onto the paper by a fuser and then the paper of the image is delivered to an output tray provided outside of the apparatus. After the transfer of images to the paper, the residual toner on the intermediate belt is removed using a cleaner.

If the color image forming apparatus is equipped with a rotational polygon mirror in the laser writing unit so as to deflect the laser beam, there may arise a problem in respect to image formation synchronization. Specifically, the intermediate transfer belt stretches because of the tolerance of the peripheral length of the intermediate transfer belt and the change of the peripheral length with time, the tolerances of the outer diameters of the rollers that firmly strains the intermediate transfer belt, and slip between the intermediate transfer belt and the rollers. Because of the stretch of the intermediate transfer belt, it is difficult to maintain the turning cycle of the intermediate transfer belt to be an integer number multiple the writing scanning interval. As a result, the scanning cycle of the laser writing unit and the turning cycle of the intermediate transfer belt are generally asynchronous, and because of this asynchronous relationship, color registration deviation occurs. Note that the problem of color registration deviation also occurs in a similar way in a color image forming apparatus using a transfer drum instead of the transfer belt.

To solve this problem, the applicants of the present invention have proposed a color image forming apparatus disclosed in Japanese Unexamined Patent Publication No. 8-152833, in which marks are formed in advance on the intermediate transfer belt, and these marks are detected by a mark detection sensor. Using the mark detection timing of the mark detection sensor as a reference, rotation of the polygon motor in the laser writing unit is controlled so as to adjust the timing of writing an image on the photoconductor belt by an appropriate period of time. In this way, color deviation in a color image is suppressed.

Further, another color image forming apparatus has also been proposed in Japanese Unexamined Patent Publication No. 10-14291, in which the driving unit of a transfer drum or a transfer belt is accelerated or de-accelerated so as to be synchronized with the writing scanning cycle; in this way, the color deviation in a color image is suppressed.

However, these color image forming apparatuses of the related art turn out to be too expensive, so a color image forming apparatus able to prevent color registration deviation in an inexpensive way and improve the quality of the image is required.

Specifically, in the color image forming apparatus disclosed in Japanese Unexamined Patent Publication No. 8-152833, the rotational speed of the polygon motor, that is, the rotational speed of the polygon mirror, is adjusted to prevent color deviation. Nevertheless, since the rotational speed of the polygon mirror is very high, it turns out to be extremely difficult from the point of view of precision to change the rotational speed while achieving synchronization, and in order to do this, a very expensive polygon motor is needed, so the total image forming apparatus may also become expensive.

In the color image forming apparatus disclosed in Japanese Unexamined Patent Publication No. 10-14291, the transfer drum or transfer belt is accelerated or decelerated so as to achieve synchronization with the writing scanning cycle, so an exclusive driving unit to do this is needed. Furthermore, since it is necessary to control speed and position of the driving unit, the driving unit, and thus the image forming apparatus, also becomes expensive.

SUMMARY OF THE INVENTION

Accordingly, it is a general object of the present invention to solve the above problems of the related art.

A more specific object of the present invention is to provide an image forming apparatus able to precisely correct asynchronous image formation and form color images of higher quality without color deviation in an inexpensive way.

To attain the above object, according to a first aspect of the present invention, there is provided an image forming apparatus, comprising an optical element unit that generates a laser beam, a rotating deflector that deflects the laser beam while rotating, a photoconductor, an image of a color being formed on the photoconductor when the photoconductor is scanned by the deflected laser beam and processed by a developing agent, a spot of the laser beam on the photoconductor moving along a first direction when the laser beam is deflected by the rotating deflector, a turnable transfer member, a plurality of the images having different colors formed on the photoconductor being transferred to a predetermined position of the turnable transfer member in sequence each time the turnable transfer member turns one cycle, a displacement driving unit that moves the optical element unit, the spot of the laser beam on the photoconductor being displaced in a second direction when the optical element unit is moved by the displacement driving unit, first detection means for outputting a first signal each time the turnable transfer member turns one cycle, second detection means for outputting a second signal when the laser beam starts to scan the photoconductor in the first direction, and calculating means for calculating a time difference between the first signal and the second signal, wherein the displacement driving unit moves the optical element unit to displace the spot of the laser beam in the second direction by a distance to change a starting position of forming each of the plurality of images of different colors on the photoconductor, the distance being determined by the time difference.

Preferably, in the image forming apparatus, a reference mark is formed on the turnable transfer member, and the first detection means outputs the first signal each time the reference mark is detected.

Further, preferably, the images transferred from the photoconductor are superimposed on the turnable transfer member and form a color image, and the turnable transfer member transfers the color image thereon to an image carrying member.

According to the above invention, a displacement driving unit that moves the optical element unit to displace the position of the beam spot on the photoconductor in the second direction (so-called sub-scanning direction), first detection means for detecting each turning cycle of the transfer member, second detection means for detecting writing timing of the laser beam on the photoconductor, and calculating means are provided.

In order to eliminate the deviation of the transfer positions on the transfer member of a number of toner images, the movably installed optical element unit is moved by the displacement driving unit to displace the position of the beam spot on the photoconductor in the sub scanning direction. The magnitude of the displacement of the beam spot on the photoconductor is determined by the time difference between the first signal from the first detection means and the second signal from the second detection means.

As a result, the starting position of forming an image on the photoconductor is precisely corrected to make transfer positions of the toner images on the transfer member uniform, so the color deviation in the color image on the transfer member is reduced.

To attain the above object, according to a second aspect of the present invention, there is provided an image forming apparatus comprising an optical element unit that is movably installed and includes a laser emitting unit for emitting a laser beam, the laser emitting unit being integrally attached to the optical element unit, a rotating deflector that deflects the emitted laser beam while rotating, a photoconductor, an image of a color being formed on the photoconductor when the photoconductor is scanned by the deflected laser beam and processed by a developing agent, a spot of the laser beam on the photoconductor moving along a first direction when the laser beam is deflected by the rotating deflector, a turnable transfer member that is in contact with the photoconductor, a plurality of the images having different colors formed on the photoconductor being transferred to a predetermined position on the turnable transfer member in sequence each time the turnable transfer member turns one cycle, said transferred images forming a color image on the turnable transfer member, a displacement driving unit that is joined with the optical element unit and moves the optical element unit, the spot of the laser beam on the photoconductor being displaced in a second direction when the optical element unit is moved by the displacement driving unit, a first detection unit that is arranged near the turnable transfer member and outputs a first signal each time the turnable transfer member turns one cycle, a second detection unit that is arranged between the rotating deflector and the photoconductor to detect the deflected laser beam and to output a second signal when the laser beam starts to scan the photoconductor in the first direction, and a calculating unit that calculates a time difference between the first signal and the second signal, wherein the displacement driving unit moves the optical element unit to displace the spot of the laser beam by a distance in the second direction to change a starting position of forming each of the plurality of images of different colors on the photoconductor in the first direction, the distance being determined by the time difference.

Preferably, in the image forming apparatus, a plurality of reference marks are formed on the turnable transfer member at regular intervals, and the first detection unit outputs the first signal each time a specified said reference mark is detected.

Further, the turnable transfer member is one of belt-like and drum-like, and the turnable transfer member further transfers the color image thereon to an image carrying member.

According to the above invention, the image forming position on the photoconductor is precisely corrected to reduce the color deviation in the color image.

Preferably, in the above image forming apparatus, the optical element unit is configured to rotate with respect to a rotational axis, said rotational axis being deviated from an optical axis of the laser beam emitted from the laser emitting unit, and the spot of the laser beam on the photoconductor is displaced approximately in the second direction when the optical element unit is rotated with respect to the rotational axis.

According to the above invention, the resolution of the displacement of the beam spot in the sub scanning direction is improvable without increasing the number of parts.

Further preferably, the rotational axis is deviated from the optical axis of the laser beam in a plane formed by the laser beam deflected by the rotating deflector.

According to the above invention, the stability of the apparatus is improved even after repeated rotations.

More preferably, the rotational axis of the optical element unit and the optical axis of the laser beam intersect approximately at the same position on the rotating deflector.

According to the above invention, changes of the optical characteristics and the diameter of the beam spot are reduced.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention will be explained with reference to the accompanying drawings.

Figure 1:
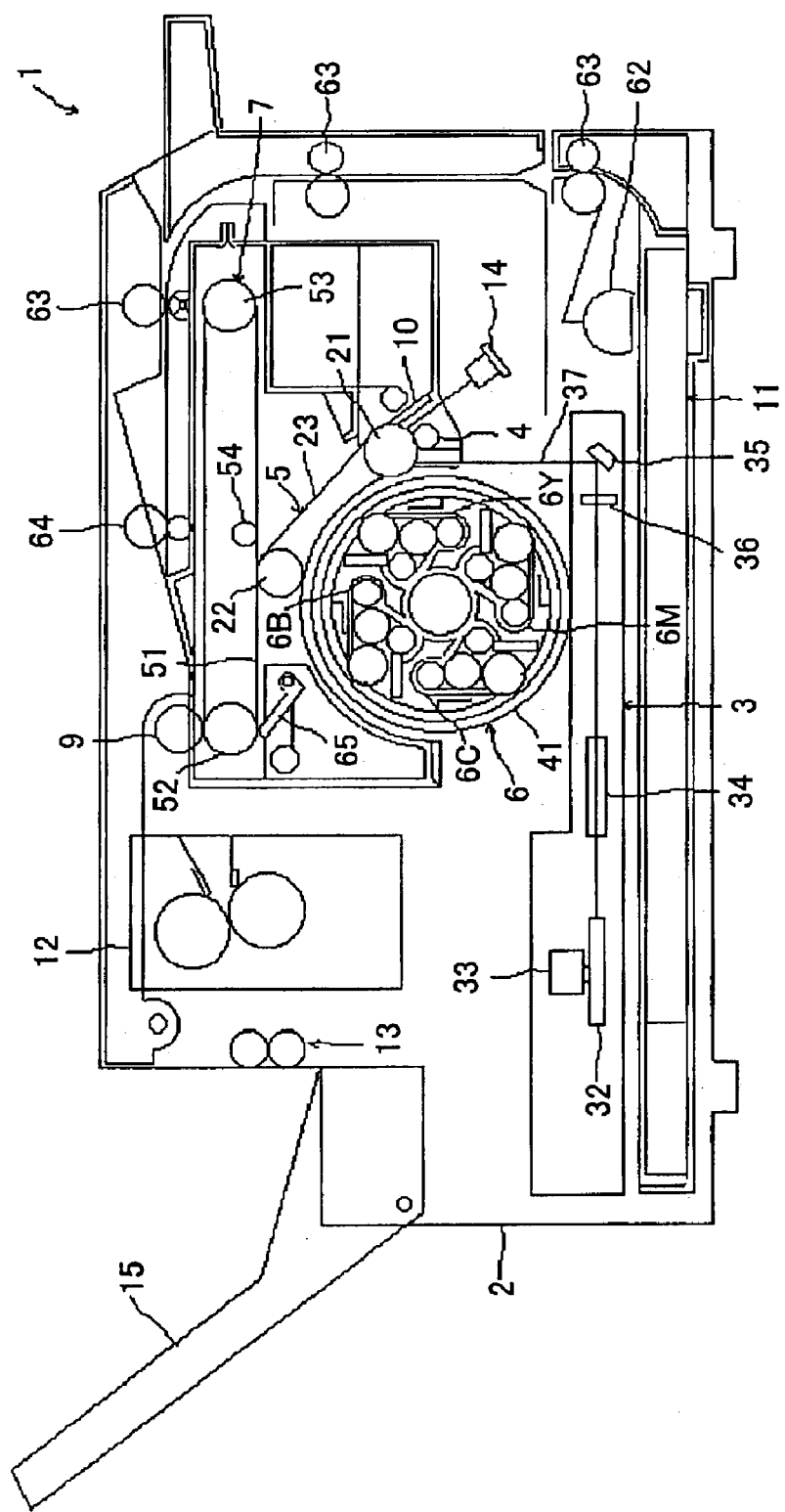
FIG. 1 is a front view of a schematic configuration of a color image forming apparatus 1 according to an embodiment of the present invention.

FIG. 1 shows a front view of a schematic configuration of a one-drum (or single engine) color image forming apparatus 1, as an example of a color image forming apparatus according to an embodiment of the present invention.

In the color image forming apparatus 1 shown in FIG. 1, there are arranged in a main housing 2 a writing unit 3, a charging roller 4, a photoconductor unit 5, a developing unit 6, a transfer unit 7, a mark detection sensor 8 (refer to FIG. 2 through FIG. 4), a transfer roller 9, a cleaner 10, a paper feeder 11, a fuser 12, a paper output unit 13, and a discharge lamp 14. In the color image forming apparatus 1, according to the image data, images are ultimately electrophotographically formed on not-shown pieces of paper, and the pieces of paper are then delivered to an output tray 15 provided outside of the main housing 2.

Figure 2:
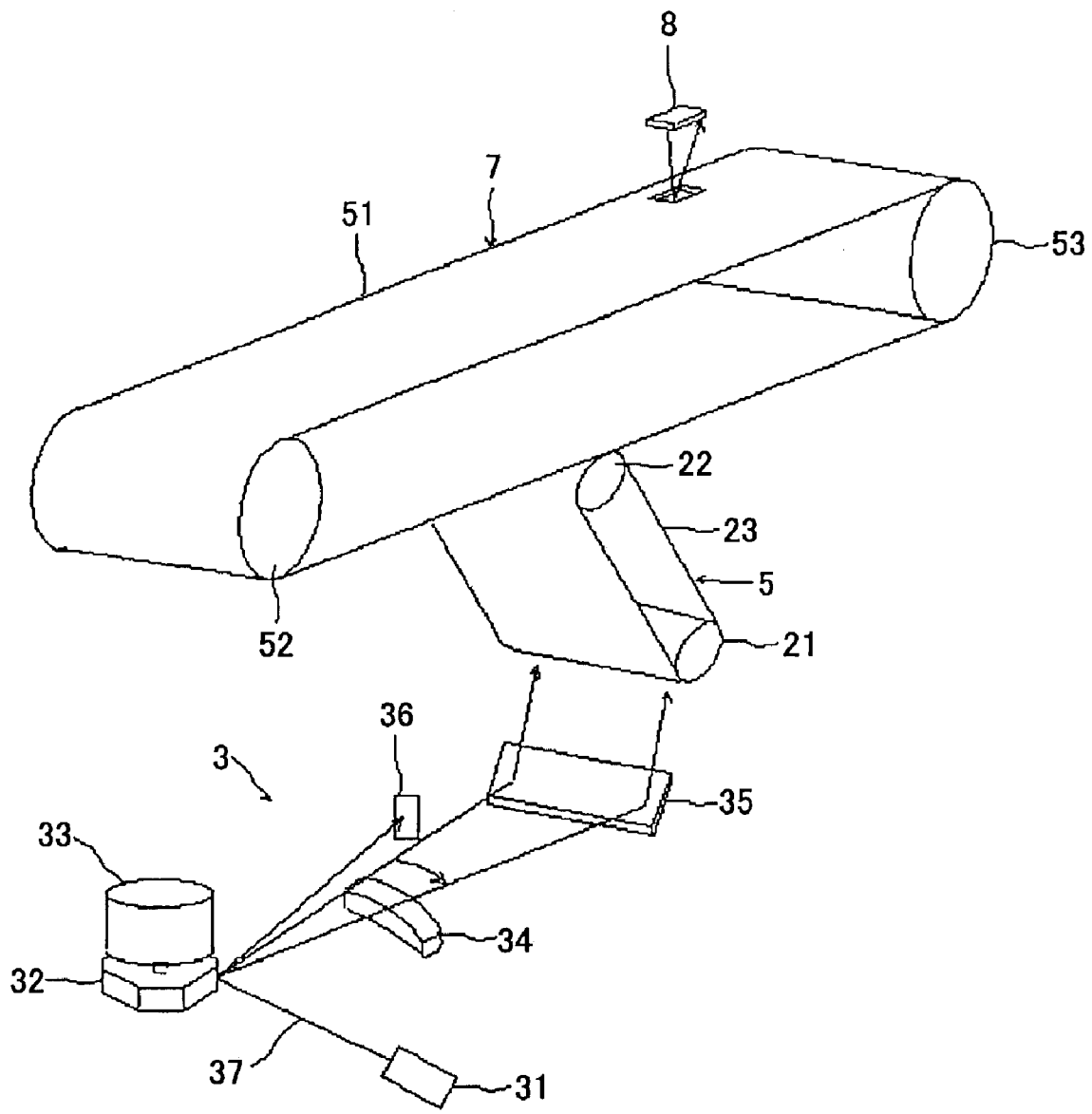
FIG. 2 is an enlarged perspective schematic view of a portion of the color image forming apparatus 1 shown in FIG. 1 including a writing unit 3, a photoconductor unit 5, and a transfer unit 7.

FIG. 2 is an enlarged perspective schematic view of a portion of the color image forming apparatus 1 including the writing unit 3, the photoconductor unit 5, and the transfer unit 7.

The photoconductor unit 5 is comprised of a pair of rollers 21 and 22, and a seamless flexible photoconductor belt 23 tensioned by the rollers 21 and 22. Driven by either or both of the rollers 21 and 22, the photoconductor belt 23 turns clockwise on the rollers.

Figure 3:
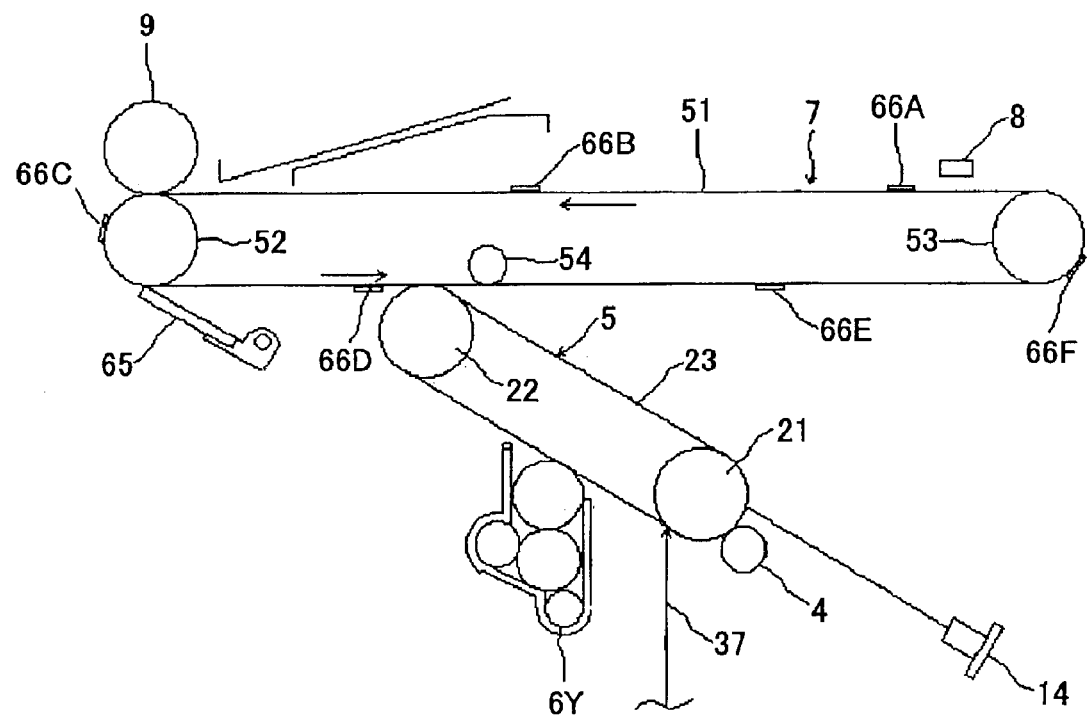
FIG. 3 is an enlarged front schematic view of a portion of the color image forming apparatus 1 shown in FIG. 1 including a photoconductor unit 5, a transfer unit 7, and a mark detection sensor 8, and a part of a developing unit 6.

As shown in FIG. 3, the charging roller 4 is arranged near the roller 21 so as to be close to the photoconductor belt 23 to charge the photoconductor belt 23 uniformly.

As shown in FIG. 2, the writing unit 3 is comprised of a laser emitting element 31, a polygon mirror 32, a motor 33 that drives the polygon mirror 32 to rotate at a specific angular speed, an fθ lens 34, a reflective mirror 35, and a sensor 36 for synchronization detection.

A laser beam 37 generated at the laser emitting element 31 and modulated according to image data is deflected by the rotating polygon mirror 32 driven by the motor 33, forming a main scanning plane as shown in FIG. 2. This laser beam is further deflected by the mirror 35 after passing through the f θ lens 34. Then the laser beam is irradiated onto the photoconductor belt 23 that has been first discharged by the discharge lamp 14 and then uniformly charged by the charging roller 4. Due to the irradiation of the laser beam 37, a latent image is formed on the photoconductor belt 23, and at the same time, the laser beam is irradiated on the sensor 36 provided in the main scanning direction and at a distance from the photoconductor belt 23. The sensor 36 detects the laser beam and outputs a main scanning synchronization signal as the detection result.

Here, the photoconductor belt 23 corresponds to the photoconductor, the polygon mirror 32 corresponds to the rotating deflector, the sensor 36 corresponds to the second detection unit, and the main scanning synchronization signal corresponds to the second signal in claims of the present invention.

Here, for example, the polygon mirror 32 has six mirror surfaces.

The developing unit 6, for example, is comprised of a yellow developer 6Y, a cyan developer 6C, a magenta developer 6T, and a black developer 6B installed on a drum 41. When the drum 41 rotates, the developers 6Y, 6C, 6T, and 6B come to face the photoconductor belt 23 sequentially, and one of them accretes a toner (developing agent) of the corresponding color to the latent image formed on the photoconductor belt 23, thereby the latent image is turned into a visible image of the same color. Specifically, the developing unit 6 has a number of developing sleeves arranged near or in contact with the photoconductor belt 23, and it has the function of turning a latent image on the photoconductor belt 23 into a visible image by non-contact developing or contact developing.

As shown in FIG. 1 through FIG. 4, the transfer unit 7 has an intermediate transfer belt 51 that is in contact with the photoconductor belt 23. The intermediate transfer belt 51 is also a seamless belt and functions as a carrier of transferred images. The intermediate transfer belt 51 is tensioned by a pair of rollers 52 and 53 that are driven by a not-shown motor. Driven by either or both of the rollers 52 and 53, the intermediate transfer belt 51 turns counterclockwise on these rollers.

As shown in FIG. 1 and FIG. 3, on the inner surface of the intermediate transfer belt 51, a bias roller 54 is provided. The bias roller 54 applies a transfer bias supplied by a high-voltage power supply to the intermediate transfer belt 51 to transfer a toner image from the photoconductor belt 23 to the intermediate transfer belt 51. Further, as shown in FIG. 1 and FIG. 3, a transfer roller 9 is provided in contact with the intermediate transfer belt 51.

A toner image of a certain color formed on the photoconductor belt 23 is transferred to the intermediate transfer belt 51 by the bias roller 54. Toner images of different colors and sequentially formed on the photoconductor belt 23 are transferred in sequence to the same position of the intermediate transfer belt 51, and are superimposed on the intermediate transfer belt 51, thereby producing a color toner image on the intermediate transfer belt 51. The color toner image on the intermediate transfer belt 51 is finally transferred to a piece of paper fed by the paper feeder 11.

Here, the paper to which the color image is transferred corresponds to the image carrier member in claims of the present invention.

Specifically, a visible image (toner image) of the fires color on the photoconductor belt 23 is transferred to the intermediate transfer belt 51 by the bias roller 54 provided on the inner surface of the intermediate transfer belt 51, and by repeating the same process, the second, third, and the fourth visible images are also transferred to the intermediate transfer belt 51, and the transferred images are superimposed on the intermediate transfer belt 51 without position deviation with each other.

The pieces of paper having the toner images transferred are sent to the fuser 12, and are heated and pressed at the fuser 12 to fuse the toner images onto the paper, and then are delivered to the output tray 15 by the paper output unit 13 in sequence.

The paper feeder 11 is comprised of a paper feeder cassette 61, a paper feeder roller 62, a plurality of conveying rollers 63, and a resist roller 64. Pieces of paper are held in the paper feeder cassette 61. By the paper feeder roller 62, the paper feeder 11 separates the pieces of paper in the paper feeder cassette 61 into single ones and sends them out one by one. After timing adjustment, the resist roller 64 conveys the fed paper into the space between the transfer roller 9 and the intermediate transfer belt 51, and the toner image on the intermediate transfer belt 51 is transferred to a piece of paper by the transfer roller 9.

The cleaner 10 removes the residual toner on the photoconductor belt 23. The cleaner 65 is used exclusively to remove the residual toner on the intermediate transfer belt 51. The cleaner 65 is separated from the surface of the intermediate transfer belt 51 during image formation, and is pressed into contact with the intermediate transfer belt 51 only when cleaning the intermediate transfer belt 51 after image transfer.

FIG. 3 is an enlarged front schematic view of a portion of the color image forming apparatus 1 including the photoconductor unit 5, the transfer unit 7, the mark detection sensor 8, and a part of the developing unit 6.

As shown in FIG. 3, in order to prevent position deviation of toner images of different colors on intermediate transfer belt 51 and precisely align the transfer positions, six reference marks 66A through 66F are arranged on the surface of the intermediate transfer belt 51. These reference marks 66A through 66F are at appropriate intervals and are formed in a region near one side of the intermediate transfer belt 51 in the width direction, because this region is not used for the transferred toner images. The mark detection sensor 8 is placed downstream relative to the roller 53 along the turning direction of the intermediate transfer belt 51; it detects the reference marks 66A through 66F on the intermediate transfer belt 51, and outputs a reference signal.

Here, the mark detection sensor 8 corresponds to the first detection unit of the present invention, and the signal output from the mark detection mark 8 corresponds to the first signal.

Figure 4:
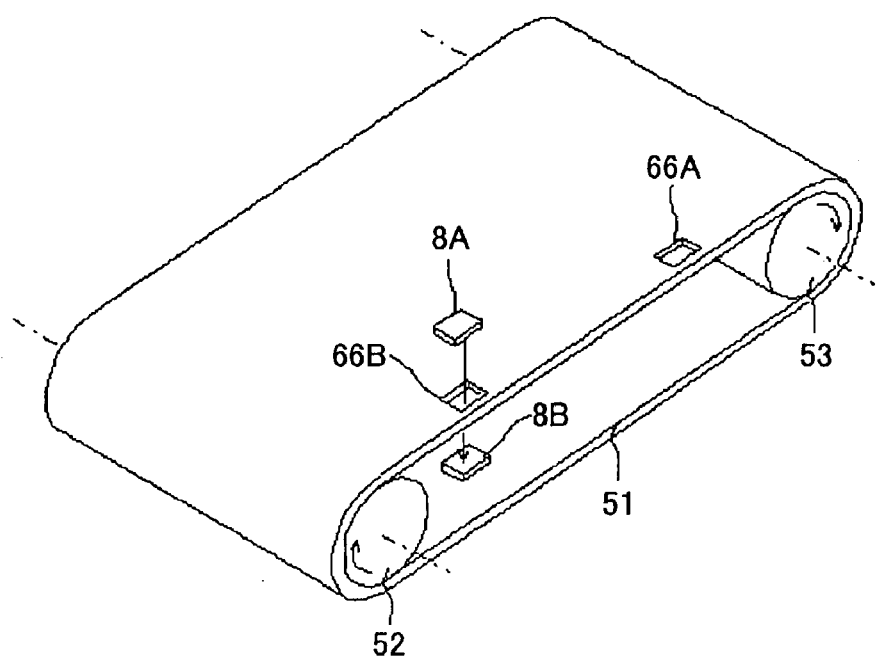
FIG. 4 is a view of an example of the mark detection sensor 8 shown in FIG. 3 having a transmission configuration.

FIG. 4 is a view of an example of the mark detection sensor 8 having a transmission configuration.

For the mark detection sensor 8, for example, a reflective photo sensor may be used, or transmission type photo sensors 8A and 8B as shown in FIG. 4 may also be used. In the latter case, the reference marks 66A through 66F may be made from transparent materials, or be formed by cut-outs, so that the photo sensors 8A and 8B are able to identify the reference marks.

In the color image forming apparatus 1, in signal processing of signals output from the mark detection sensor 8 that detects the reference marks 66A through 66F, the signal from a mark used for determining the timing of writing an image can be identified by masking signals from the other marks not used for timing determination. This can be done by using the known total number of the reference marks. After this signal processing, signals indicating the turning cycle of the intermediate transfer belt 51 are output.

A detailed explanation is provided below. The color image forming apparatus 1 starts to write an image of the first color on the photo conduct belt 23 when any mark is detected by the mark detection sensor 8, for example, the reference mark 66A, that is, the reference mark 66A is used to determine the timing of writing an image. When the intermediate transfer belt 51 turns one cycle and the reference mark 66A is detected again, the color image forming apparatus 1 starts to write an image of the second color on the photo conduct belt 23. In this case, other reference marks 66B through 66F, which are not used for determining the write timing, are identified by using the known number of the reference marks 66A through 66F, and are masked so that they do not interfere with the timing determination.

Figure 5:
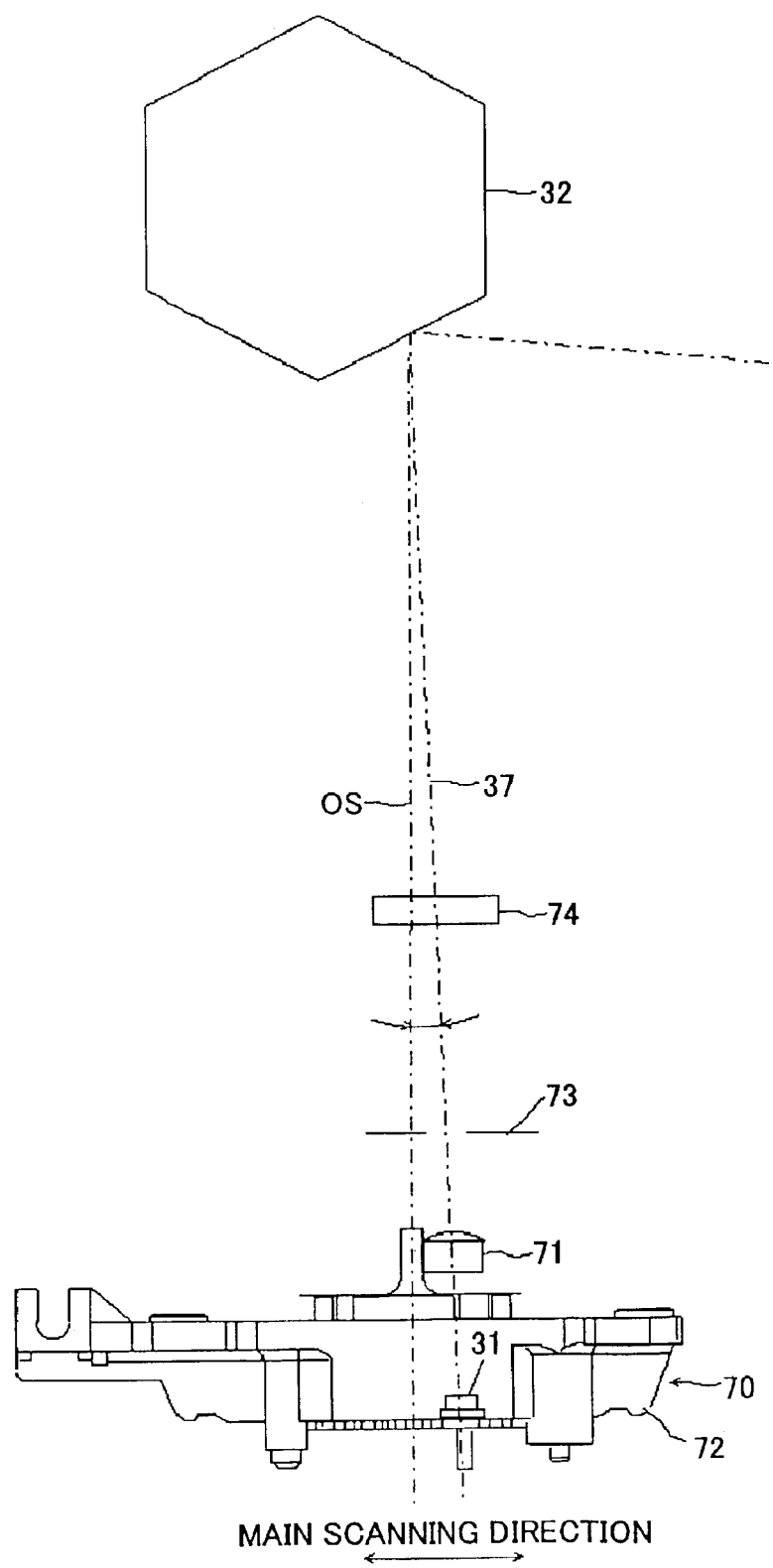
FIG. 5 is an enlarged plan view of an optical element unit 70 and a polygon mirror 32 in the writing unit 3 shown in FIG. 1.

FIG. 5 is an enlarged plan view of the optical element unit 70 and the polygon mirror 32 in the writing unit 3 shown in FIG. 1.

As shown in FIG. 5, the optical element unit 70 is comprised of the laser emitting element 31, a collimator lens 71, an aperture 73, and a cylinder lens 74 arranged between the collimator lens 71 and the polygon mirror 32.

In the optical element unit 70, the laser emitting element 31 and the collimator lens 71 are supported by a supporting member 72. The laser beam 37 emitted from the laser emitting element 31 passes through the aperture 73 and the cylinder lens 74, and is irradiated on the polygon mirror 32.

The optical element unit 70 is installed rotatably with respect to a rotational center axis OS. A not-shown optical housing accommodates the optical element unit 70 and those optical elements, which guides the laser beam to the polygon mirror 32 and the photoconductor belt 23.

In the optical element unit 70, the laser emitting element 31 is mounted so that the optical axis of the laser beam 37 is inclined relative to the rotational center axis OS of the optical element unit 70. Furthermore, specifically, the rotational center axis OS of the optical element unit 70 is in the scanning plane of the laser beam 37, in other words, the rotational center axis OS of the optical element unit 70 is inclined in the main scanning direction. Furthermore, the laser emitting element 31 is mounted so that the rotational center axis OS of the optical element unit 70 and the optical axis of the laser beam 37 nearly coincide at the laser deflecting position on the polygon mirror 32.

Figure 6:
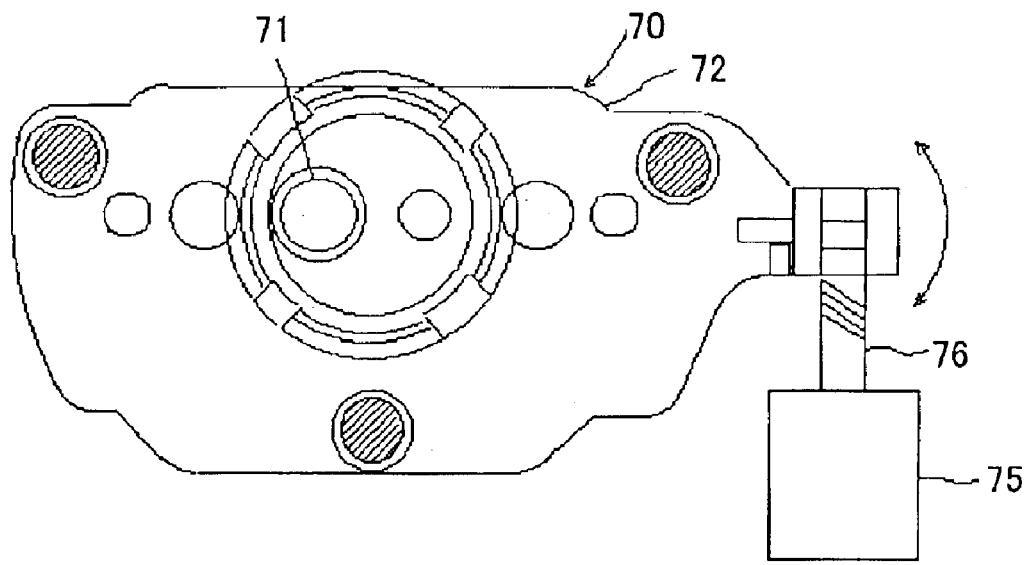
FIG. 6 is a front view of the optical element unit 70 shown in FIG. 5.

FIG. 6 is a front view of the optical element unit 70.

As shown in FIG. 6, the optical element unit 70 is joined by a screw 76 with a beam position adjustment motor 75 which is able to move the optical element unit 70, and in turn, adjust the position of the laser beam 37. In detail, when the beam position adjustment motor 75 rotates, the screw 76 rotates, too, driving the optical element unit 70 to rotate as shown by the arrow in FIG. 6 with respect to the rotational center axis OS. When the optical element unit 70 rotates with respect to the rotational center axis OS, the laser beam 37 emitted from the laser emitting element 31 moves along a circle with a center on the rotational center axis, and this movement causes a displacement of the spot of the laser beam 37 on the photo conduct belt 23 as shown in FIG. 7.

Figure 7:
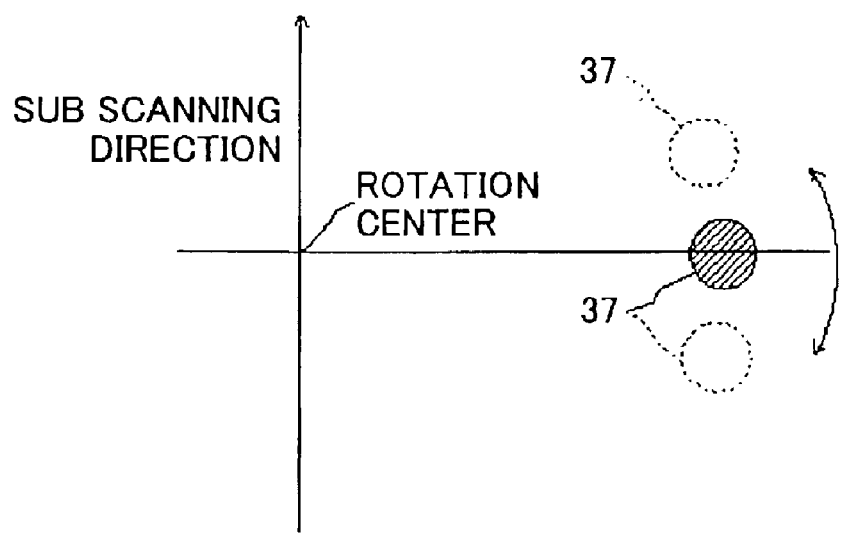
FIG. 7 is a view showing movement of the spot of the laser beam 37 on the photoconductor belt 23 in the sub scanning direction caused by rotation of the optical element unit 70 shown in FIG. 5 and FIG. 6.

FIG. 7 shows displacement of the spot of the laser beam on the photo conduct belt 23 in the sub scanning direction caused by rotation of the optical element unit 70.

As shown in FIG. 7, due to rotation of the optical element unit 70 as shown above, the spot of the laser beam 37 on the photo conduct belt 23 moves in the sub scanning direction along a circle whose center is on the rotational center axis OS.

Here, by rotating the optical element unit 70 with respect to the rotational center axis OS, it is possible to precisely correct color deviation as described below. Since the optical element unit 70 is rotated with respect to the rotational center axis OS, the device is stable even after repeated rotations.

For example, a stepping motor outputting twenty pulses in each turn may be used for the beam position adjustment motor 75. When using such a motor to measure the rotational angle of the optical element unit 70 and the position of the laser beam spot on the photoconductor belt 23, the displacement of the beam spot in the sub scanning direction can be determined with a precision of 1 μm, and this resolution is good enough. This precision is related to the pulse width and period of each pulse of the stepping motor.

Note that, in the color image forming apparatus 1 of the present embodiment, as shown in FIG. 7, when the optical element unit 70 is rotated, because the beam spot moves along a circle, strictly speaking, the position of the beam spot changes not only in the sub scanning direction but also in the main scanning direction. However, the displacement in the main scanning direction does not create a problem, because the displacement in the main scanning direction is sufficiently small compared with that in the sub scanning direction, moreover, this small displacement can be corrected by making corrections using the results of the sensor 36, which measures the synchronization in the main scanning direction.

Figure 8:
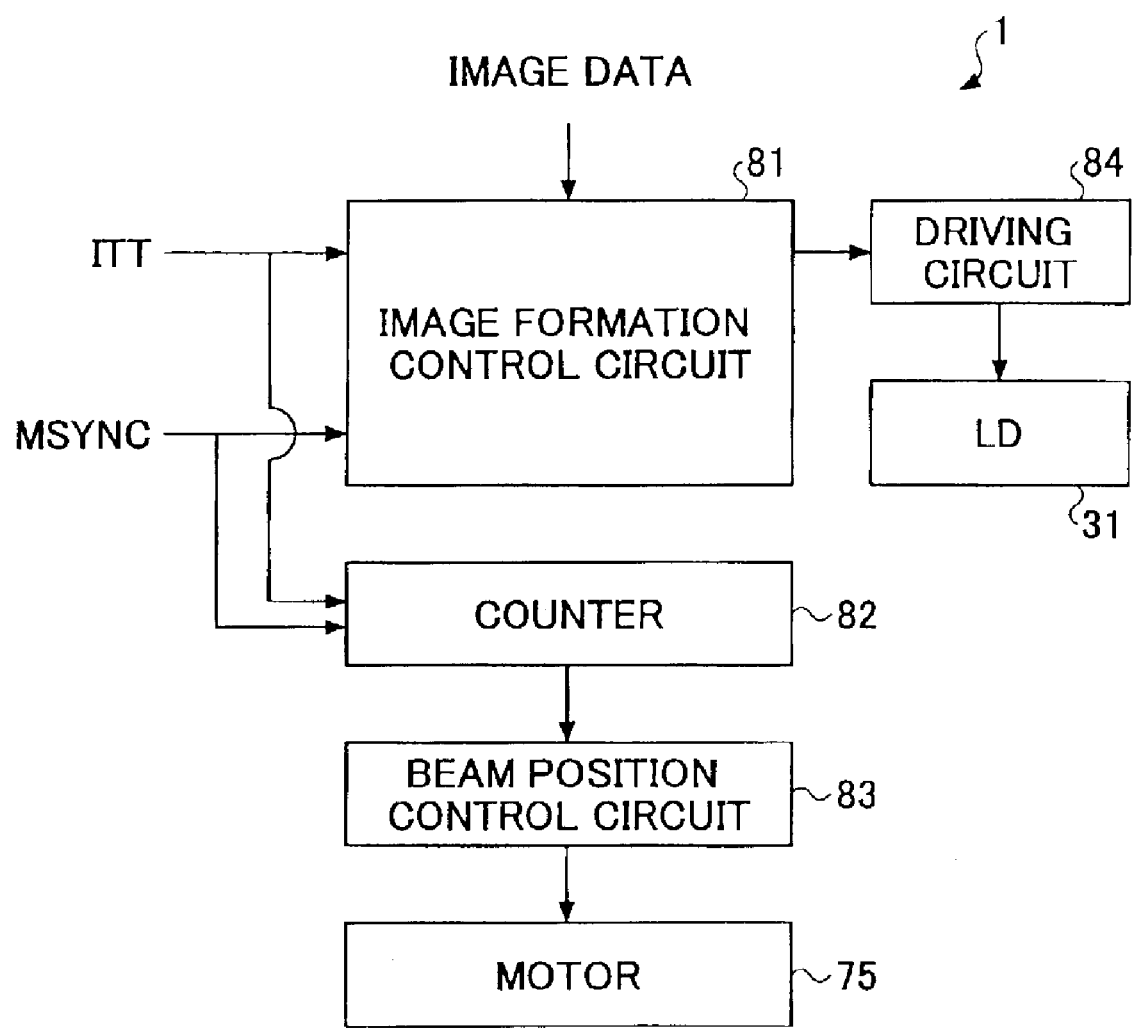
FIG. 8 is a block diagram of a principle portion of the color image forming apparatus 1 shown in FIG. 1.

FIG. 8 is a block diagram showing a principle portion of the color image forming apparatus 1.

As shown in FIG. 8, the color image forming apparatus 1 comprises an image formation control circuit 81, a counter 82, a beam position control circuit 83, a driving circuit 84 of the laser emitting element 31, the laser emitting element 31 (denoted as "LD" in FIG. 8), and the beam position adjustment motor 75.

The image formation control circuit 81 receives the main scanning synchronization signal (abbreviated as "MSYNC" in FIG. 8) output from the sensor 36, the signal output from the mark detection sensor 8 indicating the turning cycle of the intermediate transfer belt 51 (abbreviated as "ITT" below and in FIG. 8), and image data. Based on these signals, the image formation control circuit 81 outputs a control signal to the driving circuit 84; directed by this control signal, the driving circuit 84 turns on the laser emitting element 31.

The counter 82 receives the main scanning synchronization signal from the sensor 36 and the ITT signal from the mark detection sensor 36, and counts the time difference between the main scanning synchronization signal and the ITT signal, and outputs the count to the beam position control circuit 83.

Based on the count from the counter 82, the beam position control circuit 83 drives the beam position adjustment motor 75 to rotate, and displaces the spot of the laser beam 37 in the sub scanning direction by a distance determined by the time difference between the main scanning synchronization signal and the ITT signal, and this displacement of the beam spot corrects the writing position of an image, and so compensates for position deviation of images on the intermediate transfer belt 51 and thus eliminates color deviation in a final color image.

Here, the counter 82 corresponds to the calculating unit, and the beam position control circuit 83 and the beam position adjustment motor 75 correspond to the displacement driving unit in claims of the present invention.

Next, the function of the color image formation apparatus 1 according to the present embodiment is described below.

In the color image formation apparatus 1 of the present embodiment, as shown above, the laser beam 37 from the writing unit 3 is irradiated onto the photoconductor belt 23 that has been uniformly charged by the charging roller 4, and latent images of yellow (Y), cyan (C), magenta (M), and black (B) colors are formed on the photo conduct belt 23 in sequence. Once a latent image of any color, for example, the yellow color, is written on the photoconductor belt 23, the yellow latent image is turned into a yellow toner image immediately by the yellow developer 6Y in the developing unit 6, and then the toner image on the photo conduct belt 23 is transferred to the intermediate transfer belt 51.

The above processes, including formation of a latent image on the photoconductor belt 23 by the writing unit 3, development of the latent image on the photoconductor belt 23 by a developer of the corresponding color in the developing unit 6, and transfer of the toner image from the photoconductor belt 23 to the intermediate transfer belt 51, are also performed for images of cyan (C), magenta (M), and black (B) colors in sequence, and this results in a color toner image on the intermediate transfer belt 51.

The color toner image on the intermediate transfer belt 51 is transferred to pieces of paper fed from the paper feeder 11 into the space between the transfer roller 9 and the intermediate transfer belt 51 after timing adjustment by the resist roller 64. The pieces of paper having the toner image transferred are sent to the fuser 12, and are heated and pressed by the fuser 12 to fuse the toner image onto the paper, and then are delivered to the output tray 15 by the paper output unit 13 in sequence.

When transferring a toner image of a certain color on the photo conduct belt 23 to the intermediate transfer belt 51, the transfer position of this toner image should be precisely equal to that of the formerly transferred toner image of another color.

As shown in FIG. 3, in order to prevent position deviation of toner images of different colors on the intermediate transfer belt 51 and make the transfer positions of the color images precisely uniform, six reference marks 66A through 66F are formed at certain intervals and in a region close to one side of the intermediate transfer belt 51 in the width direction, which is not used for toner image transfer. Further, the mark detection sensor 8 is arranged, at a position downstream relative to the roller 53 along the turning direction of the intermediate transfer belt 51. The mark detection sensor 8 detects the reference marks 66A through 66F on the intermediate transfer belt 51, and outputs signals indicating one turning cycle of the intermediate transfer belt 51 (the ITT signal).

Figure 9:
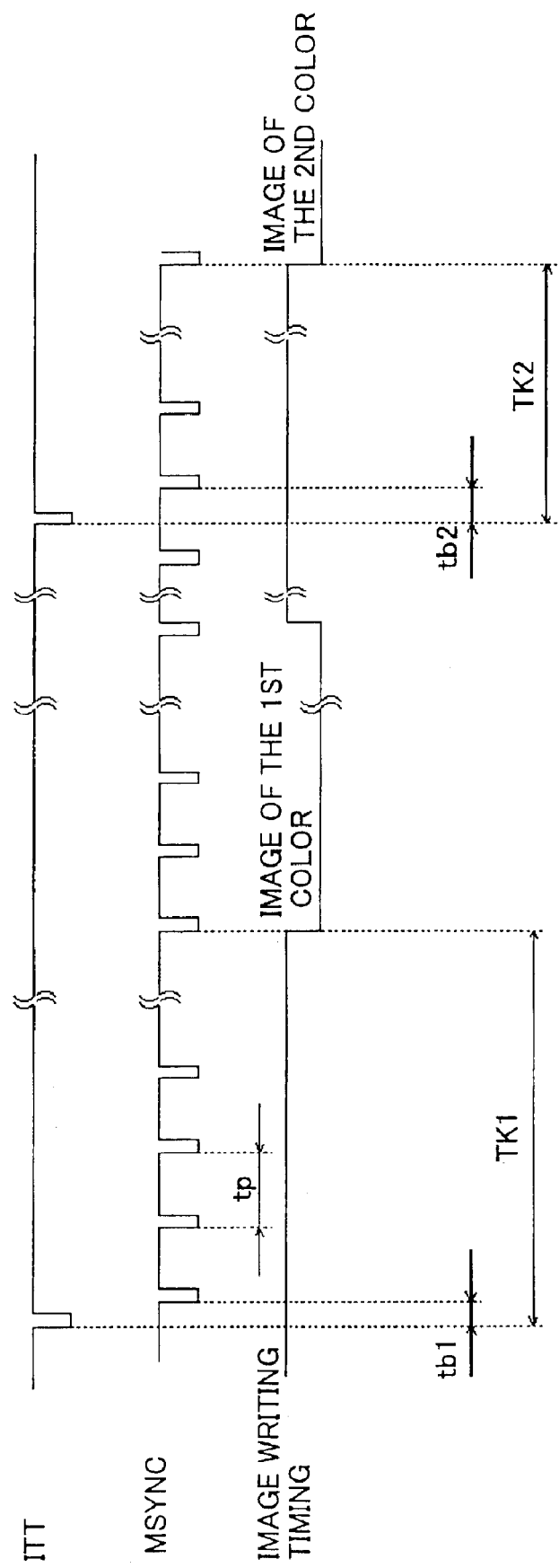
FIG. 9 is a timing chart of a main scanning synchronization signal, an intermediate transfer turning detection signal, and an image writing timing signal.

FIG. 9 is a timing chart of the main scanning synchronization signal, the ITT signal, and a signal indicating image writing timing (abbreviated as "WT" in FIG. 9).

As shown in FIG. 9, based on a signal output when the mark detection sensor 8 detects any mark out of the six reference marks 66A through 66F, for example, the reference mark 66A, and after a specified time delay Tk1, the writing unit 3 is started to write an image of the first color to the photo conduct belt 23, that is, the writing unit 3 irradiates the laser beam 37 modulated by an image signal associated with the yellow color image. The time delay Tk1 is expressed by the following equation, and is the sum of the time difference tb1 between the signal indicating detection of the reference mark 66A and the synchronization signal from the synchronization detection sensor 36, and the period tp of the synchronization signal multiplied by an integer number n.

$$Tk1 = tb1 + n \times tp$$

where, n is an integer number.

In the above, the synchronization signal corresponds to the "second signal" in claims of the invention.

When the intermediate transfer belt 51 turns one cycle and the reference mark 66A is detected again, based on a signal output by the mark detection sensor 8 indicating detection of the reference mark 66A, and after a specified time delay Tk2, the writing unit 3 is started to write an image of the second color to the photo conduct belt 23, that is, the writing unit 3 enables irradiates the laser beam 37 modulated by an image signal related to the magenta color image.

The time delay Tk2 is expressed by the following equation, and is the sum of the time difference tb2 between the signal indicating detection of the reference mark 66A and a synchronization signal from the synchronization detection sensor 36, and the period tp of the synchronization signal multiplied by an integer number n.

$$Tk2 = tb2 + n \times tp$$

where n is an integer number.

Similarly, the color image forming apparatus 1 forms the cyan image and the black image on the photo conduct belt 23, taking into consideration time delays Tk3, Tk4 defined in the same way for correcting the starting timing of the cyan image and the black image, respectively.

However, the intermediate transfer belt 51 stretches for various reasons. For example, the stretching of the intermediate transfer belt 51 is caused by the tolerance and the change with time of the peripheral length of the intermediate transfer belt 51, and other reasons causing uncertainties, such as, the tolerances of the outer diameters of the rollers tensioning the intermediate transfer belt 51, and slip between the intermediate transfer belt 51 and these rollers. Because of the stretching of the intermediate transfer belt, the main scanning synchronization detection signal is not synchronized with the ITT signal, and the time delays tb1, tb2, tb3, and tb4 fluctuate within the range of ±0.5*tp. Consequently, the positions of images of different colors on the intermediate transfer belt 51 are different.

Figure 10:
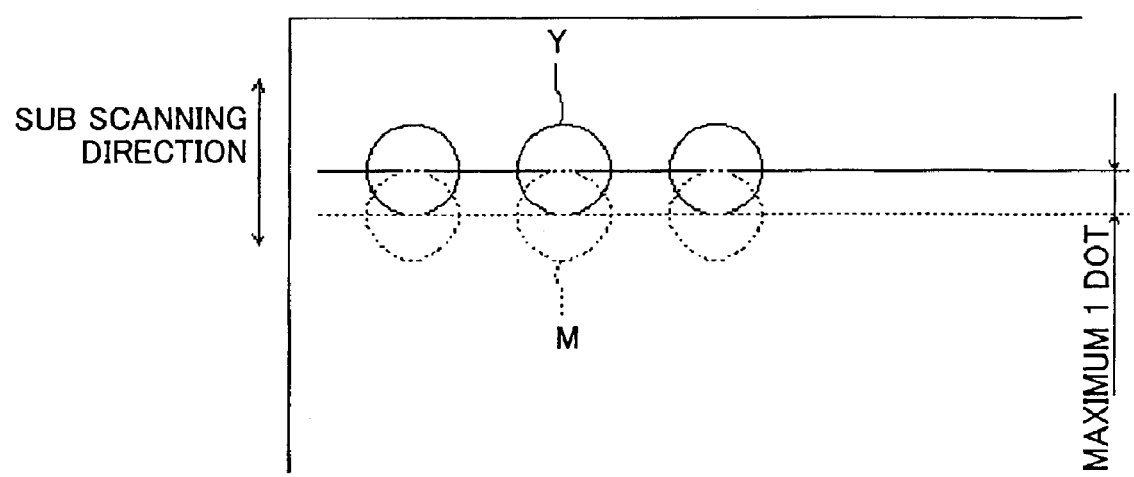
FIG. 10 is view showing deviation of pixels in the sub scanning direction caused by the tolerance of the peripheral length of the intermediate transfer belt 51, the change of the peripheral length with time, and other uncertainties.

FIG. 10 shows deviation of pixels in the sub scanning direction caused by the tolerance of the peripheral length of the intermediate transfer belt 51, the change of the peripheral length with time, and other uncertainties as described above.

Shown in FIG. 10 are magenta pixel (M) and yellow pixel (Y). As shown in FIG. 10, the positions of magenta pixel (M) and yellow pixel (Y) deviate at most one dot.

So, in the color image forming apparatus 1 related to the present embodiment, a method of correcting the color deviation is proposed. In this method, the time difference between the main scanning synchronization detection signal and the ITT signal is measured; specifically, the counter 82 is used to count the time difference between the main scanning synchronization detection signal and the ITT signal. Based on the count from the counter 82, the beam position control circuit 83 controls the beam position adjustment motor 75 so as to displaces the spot of the laser beam 37 in the sub scanning direction by a distance determined by the time difference. This displacement corrects the deviation of transfer positions of images of different colors on the intermediate transfer belt 51, and compensates for color deviation in a color image.

For example, when the polygon mirror 32 having six mirror surfaces is rotated at a speed of 20,000 rpm, and an image having a pixel density of 600 dpi is formed by using a single beam laser emitting element 31, the intervals of the main scanning synchronization detection signal are 500 μs. For example, if the time difference tb1 between the signal indicating detection of the reference mark 66A and the synchronization signal from the synchronization detection sensor 36 (the main scanning synchronization detection signal) is 100 μs, the position displacement X1 equivalent to this time difference tb1 is given by the following equation.

$$X1 = 42.3 \ \mu m \times 100 \ \mu s / 500 \ \mu s$$
$$= 42.3 \ \mu m \times tb1 / 500 \ \mu s$$
$$= 8.5 \ \mu m$$

where the length of one dot is 42.3 μm.

So, as shown above, if the writing unit 3 starts to write the image of the first color with a time delay of 500 pulses of the main scanning synchronization detection signal, in this time period, the beam position adjustment motor 75 displaces the beam spot on the photoconductor belt 23 by a distance of 8.5 μm to correct the writing position and compensate position deviation. In this case, the beam spot is displaced toward the developing unit 6 shown in FIG. 3.

Next, when the time difference tb2 is 400 μs, which is the time difference between the signal indicating detection of the reference mark 66A (the ITT signal) and the synchronization signal from the synchronization detection sensor 36, the position displacement X2 equivalent to this time difference tb2 is given by the following equation.

$$X2 = 42.3 \ \mu m \times 400 \ \mu s / 500 \ \mu s - X1$$

-continued $$= 42.3 \text{ µm} \times (tb2 - tb1)/500 \text{ µs}$$
$$= 25.4 \text{ µm}$$

Because when making correction for the image of the second color, the deviation of the image of the first color has been corrected, the former position displacement X1 should be subtracted to obtain the actual position displacement X2. Further, for corrections for the image of the third and fourth colors, when the time differences tb3 and tb4 between the ITT signal and the synchronization signal from the synchronization detection sensor 36 are both 400 µs, the position displacement X3, X4 equivalent to the time difference tb3 and tb4 is given by the following equations, respectively.

$$X3 = 42.3 \text{ µm} \times tb3/500 \text{ µs} - X1 - X2$$
$$= 42.3 \text{ µm} \times (tb3 - tb2)/500 \text{ µs}$$
$$X4 = 42.3 \text{ µm} \times tb4/500 \text{ µs} - X1 - X2 - X3$$
$$= 42.3 \text{ µm} \times (tb4 - tb3)/500 \text{ µs}$$

and they are both zero.

In this way, based on these position displacements X2, X3, X4, the beam position adjustment motor 75 displaces the beam spot on the photoconductor belt 23 accordingly to correct the writing position of the image of each color and so to make the transfer positions uniform. This eliminates the color deviation.

In the present example, to displace the spot of the laser beam 37 along the sub scanning direction, the screw 76 is rotated by the beam position adjustment motor 75, further the optical element unit 70 is rotated with respect to the rotational center axis OS. Consequently, the laser beam 37 emitted from the laser emitting element 31 is moved along a circle having a center on the rotational center axis OS, and the spot of the laser beam 37 is displaced on the photo conduct belt 23 on a circle having a center on the rotational center axis OS along the sub scanning direction as shown in FIG. 7.

Figure 11:
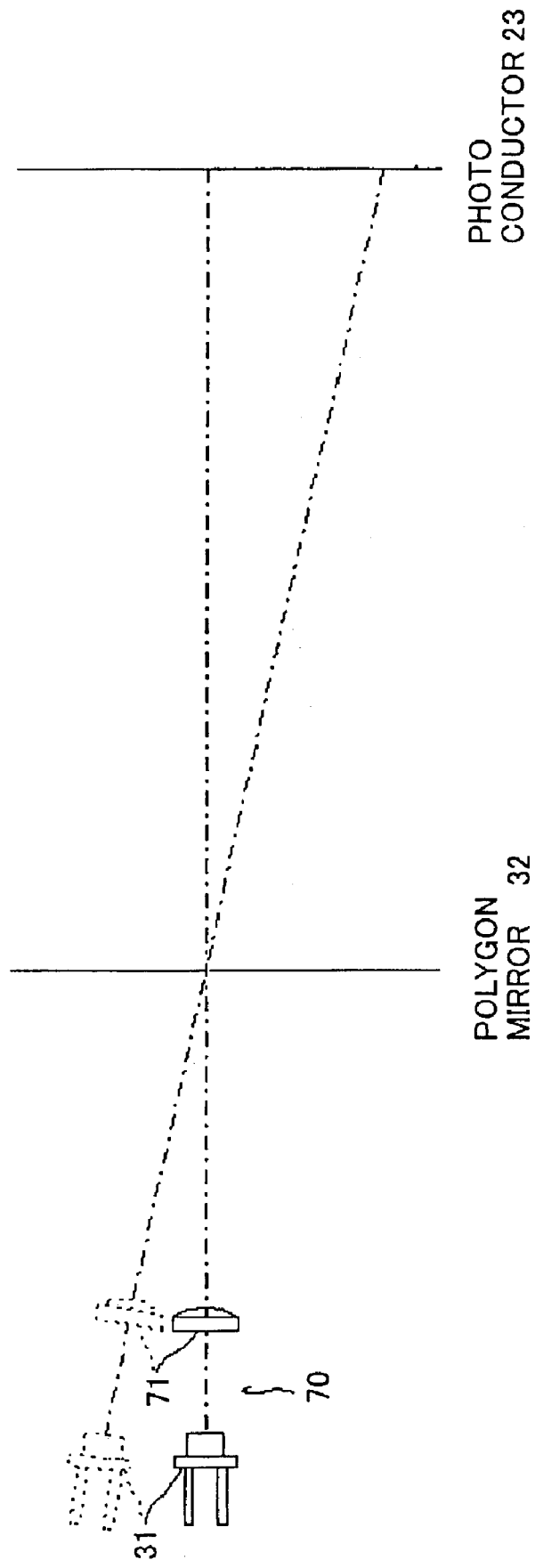
FIG. 11 is a view showing displacement of the spot of the laser beam 37 on the photo conduct belt 23 caused by rotation of the optical element unit 70.

FIG. 11 shows displacement of the spot of the laser beam 37 on the photoconductor belt 23 caused by rotation of the optical element unit 70.

As shown in FIG. 11, when the optical element unit 70 including the laser emitting element 31 and the supporting member 72 that supports the coupling optical system is displaced, the spot of the laser beam 37 moves on the photoconductor belt 23.

The method for displacing the beam spot along the sub scanning direction is not limited to this. For example, the beam spot can also be shifted by displacing the reflective mirror 35 in the writing unit 3.

In this case, however, a small change of the angle of the reflective mirror 35 may cause a large displacement of the beam spot, so, in practice precision is a problem, making this method not practical.

There are still other methods. For example, a glass plate may be placed in front of the polygon mirror 32 and at an inclination angle relative to the laser beam 37; the beam spot can be changed by changing the angle of the glass plate.

In this case, however, the number of parts increases; further, when the flatness precision of the glass plate surface is not sufficient, the image formation performance of the color image formation apparatus may be adversely influenced.

Therefore, in the color image formation apparatus 1 of the present embodiment, the laser beam 37 emitted from the laser emitting element 31 of the optical element unit 70 passes through the collimator lens 71, and is deflected in the main scanning direction at the polygon mirror 32, and is irradiated to the photoconductor belt 23 and forms latent images thereon after passing through some optical elements. The toner (developing agent) of a corresponding color is accreted from the developing unit 6 to the latent image formed on the photo conduct belt 23, and a latent image is developed into a visible image of the same color (toner image). Then the thus formed number of toner images of different colors on the photo conduct belt 23 are transferred to the intermediate transfer belt 51 in sequence while the transfer positions of the toner images are aligned. The toner images of different colors are overlapped on the intermediate transfer belt 51, and a color toner image is formed.

The optical element unit 70 is installed movably. When a toner image is formed on the photoconductor belt 23, the optical element unit 70 is moved driven by the beam position control circuit 83 and the beam position adjustment motor 75, and thereby the beam spot on the photoconductor belt 23 is displaced in the sub scanning direction. Particularly, in the present embodiment, the beam position control circuit 83 and the beam position adjustment motor 75 are controlled based on a count from the counter 82 representing the time difference between the ITT signal from the mark detection sensor 8 indicating one turning cycle of the intermediate transfer belt 51 and the main scanning synchronization signal output from the synchronization detection sensor 36 indicating writing timing of the laser beam 37 on the photo conduct belt 23.

In this way, the position deviations of the latent images of different colors formed on the photoconductor belt 23 are precisely corrected, and the transfer positions on the intermediate transfer belt 51 are made uniform. This enables prevention of position deviation of images on the intermediate transfer belt 51, and color deviation in the final color image as well. So formation of color images of high quality in an inexpensive way is possible.

Further, in the color image formation apparatus 1 of the present embodiment, the optical element unit 70 is installed rotatably with respect to the rotational center axis OS deviated from the optical axis of the laser beam 37 by a certain distance. With this configuration, when starting to form an image of a color, the beam position control circuit 83 and the beam position adjustment motor 75 drive the optical element unit 70 to rotate relative to the rotational center, displacing the beam spot of the laser beam 37 on the photoconductor belt 23 in the sub scanning direction by a distance. This distance is determined by the time difference between the ITT signal and the main scanning synchronization signal given by the counter 82.

As a result, without increasing the number of parts, the resolution of displacement in the sub scanning direction is improved, and the color deviation is corrected with a higher precision, and color images of higher quality can be formed in an inexpensive way.

Further, in the color image formation apparatus 1 of the present embodiment, the rotational center axis OS of the optical element unit 70 is deviated from the optical axis of the laser beam 37 mainly in the main scanning direction.

As a result, the stability of the apparatus is improved even after repeated rotations, the resolution of beam spot displacement can be improved, the color deviation can be corrected with a higher precision, and color images of higher quality can be formed in an inexpensive way.

Further, in the color image formation apparatus 1 of the present embodiment, the rotational center axis OS of the optical element unit 70 and the optical axis of the laser beam 37 nearly coincide at the laser deflecting position on the polygon mirror 32.

As a result, it is possible to reduce the change of the optical characteristics and the change of diameter of the beam spot, and color images of higher quality can be formed in an inexpensive way.

While the present invention has been described with reference to specific embodiments chosen for purpose of illustration, it should be apparent that the invention is not limited to these embodiments, but numerous modifications could be made thereto by those skilled in the art without departing from the basic concept and scope of the invention.

Summarizing the effect of the invention, a laser beam emitted from the laser emitting element of the optical element unit is deflected in the main scanning direction by a deflector, and is irradiated to the photoconductor and forms an image of a color (toner image) thereon after being developed by a developing agent of a corresponding color. A number of such formed toner images each having a different color formed on the photoconductor are transferred to a belt-like or a drum-like transfer member in sequence while the transfer positions of the toner images on the transfer member are being aligned. The toner images of different colors are superimposed on the transfer member, and a color toner image is formed thereon. When an image of a color is formed on the photoconductor, the optical element unit is moved by the displacement driving unit, and therefore the beam position on the photoconductor (position of the beam spot) is displaced in the sub scanning direction. The magnitude of the displacement of the beam spot on the photoconductor is determined by the time difference between the first signal from the first detection unit detecting one cycle of the transfer member and the second signal from the second detection unit detecting writing timing of the laser beam on the photoconductor.

In this way, the position deviations of the toner images of different colors formed on the transfer member can be precisely corrected. This enables prevention of color deviation in the final color image, and formation of color images of higher quality in an inexpensive way.

Further, the optical element unit is rotatably installed with the rotational axis deviated from the optical axis of the laser beam by a certain distance. With this configuration, when starting to form an image of a color on the photoconductor, the displacement driving unit drives the optical element unit to rotate relative to the rotational axis, displacing the beam spot of the laser beam on the photoconductor in the sub scanning direction. In the same way, the magnitude of the displacement of the beam spot on the photoconductor is determined by the time difference between the first signal from the first detection unit detecting one cycle of the transfer member and the second signal from the second detection unit detecting writing timing of the laser beam on the photoconductor.

As a result, without increasing the number of parts, the resolution of the displacement of the beam spot in the sub scanning direction is improvable, color deviation can be corrected with a higher precision, and color images of higher quality can be formed in an inexpensive way.

Further, the rotational axis of the optical element unit is deviated from the optical axis of the laser beam mainly in the main scanning direction.

As a result, the stability of the apparatus is improved even after repeated rotations for many times, and the resolution of beam spot displacement can be improved, and the color deviation can be corrected with a higher precision, and color images of higher quality can be formed in an inexpensive way.

Further, the rotational axis of the optical element unit and the optical axis of the laser beam nearly coincide at the same laser deflection position on the deflector.

As a result, it is possible to reduce the change of the optical characteristics and the change of diameter of the beam spot, and color images of higher quality can be formed in an inexpensive way.

This patent application is based on Japanese priority patent application No. 2002-138932 filed on May 14, 2002, the entire contents of which are hereby incorporated by reference.

What is claimed is:

1. An image forming apparatus, comprising:

an optical element unit that generates a laser beam;

a rotating deflector that deflects the laser beam while rotating;

a photoconductor, an image of a color being formed on the photoconductor when the photoconductor is scanned by the deflected laser beam and processed by a developing agent, a spot of the laser beam on the photoconductor moving along a first direction when the laser beam is deflected by the rotating deflector;

a turnable transfer member, a plurality of the images having different colors formed on the photoconductor being transferred to a predetermined position of the turnable transfer member in sequence each time the turnable transfer member turns one cycle;

a displacement driving unit that moves the optical element unit, the spot of the laser beam on the photoconductor being displaced in a second direction when the optical element unit is moved by the displacement driving unit;

first detection means for outputting a first signal each time the turnable transfer member turns one cycle;

second detection means for outputting a second signal when the laser beam starts to scan the photoconductor in the first direction; and calculating means for calculating a time difference between the first signal and the second signal, wherein the displacement driving unit moves the optical element unit to displace the spot of the laser beam in the second direction by a distance to change a starting position of forming each of the plurality of images of different colors on the photoconductor, the distance being determined by the time difference.

2. The image forming apparatus as claimed in claim 1, wherein a reference mark is formed on the turnable transfer member; and the first detection means outputs the first signal each time the reference mark is detected.

3. The image forming apparatus as claimed in claim 1, wherein the images transferred from the photoconductor are superimposed on the turnable transfer member to form a color image; and the turnable transfer member further transfers the color image thereon to an image carrying member.

4. An image forming apparatus, comprising:

an optical element unit that is movably installed and includes a laser emitting unit for emitting a laser beam, the laser emitting unit being integrally attached to the optical element unit;

a rotating deflector that deflects the emitted laser beam while rotating;

a photoconductor, an image of a color being formed on the photoconductor when the photoconductor is scanned by the deflected laser beam and processed by a developing agent, a spot of the laser beam on the photoconductor moving along a first direction when the laser beam is deflected by the rotating deflector;

a turnable transfer member that is in contact with the photoconductor, a plurality of the images having different colors formed on the photoconductor being transferred to a predetermined position on the turnable transfer member in sequence each time the turnable transfer member turns one cycle, said transferred images forming a color image on the turnable transfer member;

a displacement driving unit that is joined with the optical element unit and moves the optical element unit, the spot of the laser beam on the photoconductor being displaced in a second direction when the optical element unit is moved by the displacement driving unit;

a first detection unit that is arranged near the turnable transfer member and outputs a first signal each time the turnable transfer member turns one cycle;

a second detection unit that is arranged between the rotating deflector and the photoconductor to detect the deflected laser beam and to output a second signal when the laser beam starts to scan the photoconductor in the first direction; and a calculating unit that calculates a time difference between the first signal and the second signal, wherein the displacement driving unit moves the optical element unit to displace the spot of the laser beam by a distance in the second direction to change a starting position of forming each of the plurality of images of different colors on the photoconductor in the first direction, the distance being determined by the time difference.

5. The image forming apparatus as claimed in claim 4, wherein a plurality of reference marks are formed on the turnable transfer member at regular intervals; and the first detection unit outputs the first signal each time a specified one of said reference marks is detected.

6. The image forming apparatus as claimed in claim 4, wherein the turnable transfer member is one of belt-like and drum-like; and the turnable transfer member further transfers the color image thereon to an image carrying member.

7. The image forming apparatus as claimed in claim 4, wherein the optical element unit is configured to rotate with respect to a rotational axis, said rotational axis being deviated from an optical axis of the laser beam emitted from the laser emitting unit; and the spot of the laser beam on the photoconductor is displaced approximately in the second direction when the optical element unit is rotated with respect to the rotational axis.

8. The image forming apparatus as claimed in claim 7, wherein the rotational axis is deviated from the optical axis of the laser beam in a plane formed by the laser beam deflected by the rotating deflector.

9. The image forming apparatus as claimed in claim 8, wherein the rotational axis of the optical element unit and the optical axis of the laser beam intersect approximately at the same position on the rotating deflector.

* * * * *